United States Patent
Sakamoto

(10) Patent No.: US 9,770,900 B2
(45) Date of Patent: Sep. 26, 2017

(54) INKJET RECORDING APPARATUS

(71) Applicant: KYOCERA Document Solutions Inc., Osaka (JP)

(72) Inventor: Shoichi Sakamoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/358,821

(22) Filed: Nov. 22, 2016

(65) Prior Publication Data
US 2017/0151777 A1    Jun. 1, 2017

(30) Foreign Application Priority Data
Nov. 30, 2015 (JP) ................. 2015-233059

(51) Int. Cl.
| | |
|---|---|
| B41J 2/045 | (2006.01) |
| H04N 1/405 | (2006.01) |
| G06K 15/10 | (2006.01) |
| B41J 2/21 | (2006.01) |
| H04N 1/034 | (2006.01) |
| H04N 1/407 | (2006.01) |
| H04N 1/60 | (2006.01) |

(52) U.S. Cl.
CPC ....... *B41J 2/04535* (2013.01); *B41J 2/04586* (2013.01); *B41J 2/2132* (2013.01); *G06K 15/102* (2013.01); *H04N 1/034* (2013.01); *H04N 1/405* (2013.01); *H04N 1/407* (2013.01); *H04N 1/4055* (2013.01); *H04N 1/4078* (2013.01); *H04N 1/6033* (2013.01)

(58) Field of Classification Search
CPC .. B41J 2/04535; B41J 2/04586; B41J 2/2132; H04N 1/405; H04N 1/4055; H04N 1/407; H04N 1/4078; H04N 1/6033; H04N 1/034; G06K 15/102
See application file for complete search history.

(56) References Cited

U.S. PATENT DOCUMENTS

| | | | |
|---|---|---|---|
| 7,557,962 B2* | 7/2009 | Herron | G06K 15/02 358/1.2 |
| 7,907,307 B2* | 3/2011 | Yamazaki | B41J 29/393 347/20 |

FOREIGN PATENT DOCUMENTS

JP    2011-037810 A    2/2011

* cited by examiner

*Primary Examiner* — Anh T. N. Vo
(74) *Attorney, Agent, or Firm* — Studebaker & Brackett PC

(57) ABSTRACT

An inkjet recording apparatus includes a calculation section, a selection section, and a recording head. The calculation section calculates respective densities of first regions in pairs included in the image. The selection section selects dot patterns corresponding to the respective first regions according to the respective densities of the first regions. The recording head ejects ink onto a sheet based on a dot pattern corresponding to a region of the image other than the first regions and the dot patterns corresponding to the respective first regions. The first regions in pairs corresponds to end portions in pairs among a plurality of end portions of the image that each extend in a conveyance direction of the sheet. The dot patterns corresponding to the respective first regions each have a density lower than a corresponding one of the densities of the respective first regions calculated by the calculation section.

11 Claims, 8 Drawing Sheets

| Density range (%) | Dot pattern |
|---|---|
| 0-36 | A |
| 37-73 | B |
| 74-109 | C |
| 110-146 | D |
| 147-182 | E |
| 183-218 | F |
| 219-255 | G |

FIG. 3

INKJET RECORDING APPARATUS

INCORPORATION BY REFERENCE

The present application claims priority under 35 U.S.C. §119 to Japanese Patent Application No. 2015-233059 filed on Nov. 30, 2015. The contents of these applications are incorporated herein by reference in their entirety.

BACKGROUND

The present disclosure relates to inkjet recording apparatuses.

Inkjet recording apparatuses include a recording head. When the recording head ejects water-based ink onto a sheet, fiber of the sheet absorbs the water-based ink to cause curling of the sheet. In a situation in which the recording head re-ejects water-based ink onto the sheet to which the water-based ink has been ejected, an end portion of the sheet may waft toward the recording head to come into contact with the recording head. The sheet coming in contact with the recording head may get stained.

In view of the foregoing, an image processing method has been proposed in which amounts of coloring materials are calculated for respective ink colors from image data. In a situation in which the amounts of the respective coloring materials are large, a conversion table having a small total ink amount per pixel is selected to reduce an amount of ink droplets to be ejected onto a printing paper (sheet). As a result, occurrence of sheet curling can be prevented.

SUMMARY

An inkjet recording apparatus according to the present disclosure includes a calculation section, a selection section, and a recording head. The calculation section calculates respective densities of first regions in pairs included in an image. The selection section selects dot patterns corresponding to the respective first regions according to the densities of the respective first regions calculated by the calculation section. The recording head ejects ink onto a sheet based on a dot pattern corresponding to a region of the image other than the first regions and the dot patterns corresponding to the first regions. The first regions in pairs are end portions in pairs among a plurality of end portions of the image that each extend in a conveyance direction of the sheet. The dot patterns corresponding to the respective first regions each have a density lower than a corresponding one of the densities of the respective first regions calculated by the calculation section.

BRIEF DESCRIPTION OF THE DRAWINGS

FIG. 3 indicates a table stored in a storage section and listing image density ranges and dot patterns corresponding to the respective density ranges according to the first embodiment of the present disclosure.

DETAILED DESCRIPTION

Figure 1:
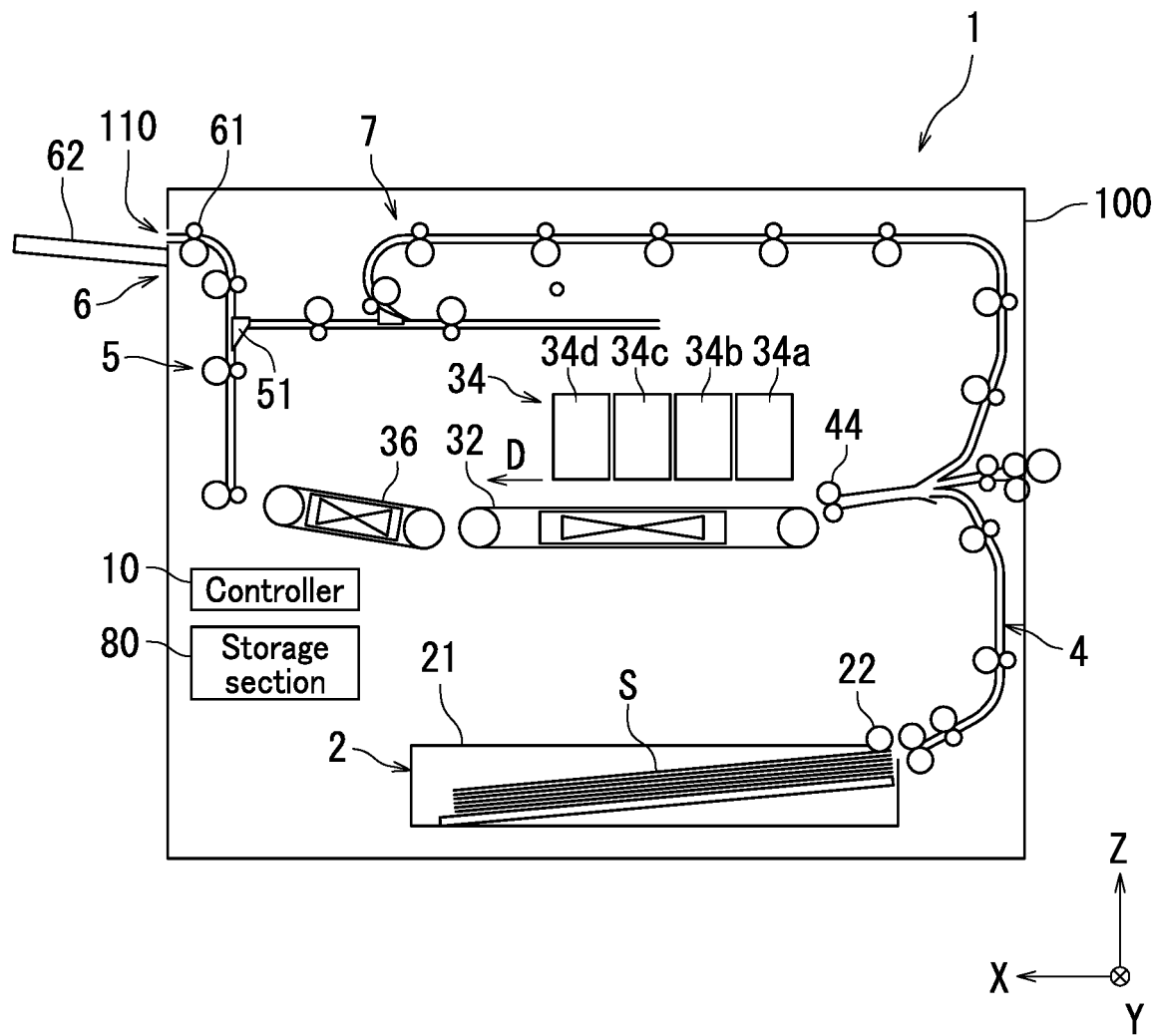
FIG. 1 is a schematic diagram illustrating an inkjet recording apparatus according to a first embodiment of the present disclosure.

The following describes embodiments of the present disclosure with reference to the accompanying drawings. Note that the following embodiments are not intended to limit the disclosure of the scope of claims. Not all of elements described in the following embodiments are essential to problem solving in the present disclosure. Like numerals in the drawings denote like elements. In the embodiments, an X axis, a Y axis, and a Z axis in the drawings are perpendicular to one another. The X axis and the Y axis are parallel to a horizontal plane, while the Z axis is parallel to a vertical line.

First Embodiment

Figure 2:
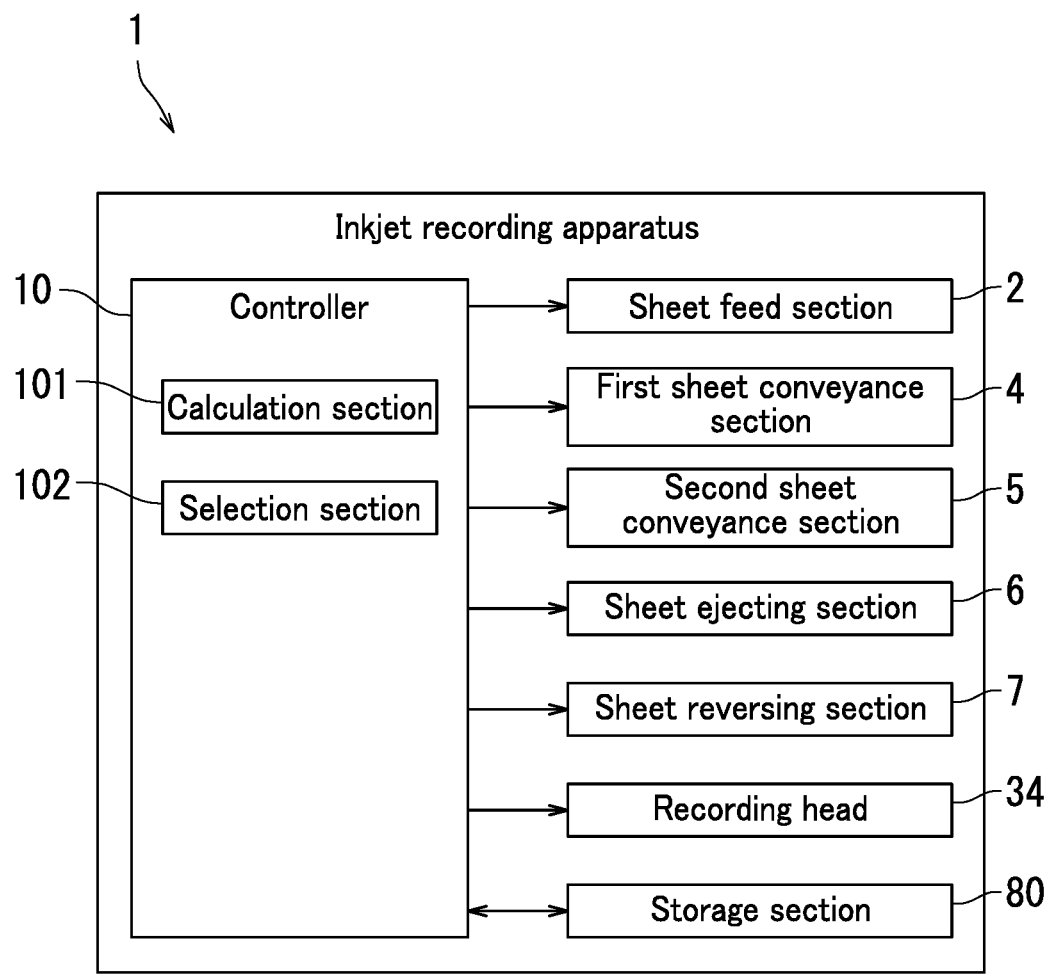
FIG. 2 is a block diagram illustrating a configuration of the inkjet recording apparatus according to the first embodiment of the present disclosure.

An inkjet recording apparatus 1 according to a first embodiment will be described first with reference to FIGS. 1 and 2. FIG. 1 is a schematic diagram illustrating the inkjet recording apparatus 1. FIG. 2 is a block diagram illustrating the inkjet recording apparatus 1.

The inkjet recording apparatus 1 includes an apparatus casing 100, a sheet feed section 2, a first sheet conveyance section 4, a second sheet conveyance section 5, a sheet ejecting section 6, a sheet reversing section 7, a controller 10, and a storage section 80. The inkjet recording apparatus 1 further includes a first conveyor belt 32, a second conveyor belt 36, and four types of recording heads 34a, 34b, 34c, and 34d. The four types of recording heads 34a, 34b, 34c, and 34d have the same configuration and therefore may be referred to collectively as recording heads 34. The inkjet recording apparatus 1 may be a multifunction peripheral having at least two functions of a copy function, a scan function, and a fax function.

The sheet feed section 2 includes a sheet feed cassette 21 and a sheet feed roller 22. The sheet feed cassette 21 is attachable to and detachable from the apparatus casing 100. The sheet feed cassette 21 accommodates a plurality of sheets S. The sheets S are an example of recording media. The sheet S are for example plain paper, copy paper, recycled paper, thin paper, cardboard, glossy paper, or overhead projector (OHP) films. The sheet feed roller 22 is disposed at one side end (right side end in FIG. 1) of the sheet feed cassette 21. The sheet feed roller 22 picks up an uppermost sheet S among the sheets S accommodated in the sheet feed cassette 21 one at a time. The sheet feed roller 22 may be referred to as a pickup roller.

The first sheet conveyance section 4 extends from the sheet feed section 2 to the first conveyor belt 32 to convey the sheet S picked up by the sheet feed roller 22 to the first conveyor belt 32. The first sheet conveyance section 4 includes a pair of registration rollers 44.

The pair of registration rollers 44 performs skew correction on the sheet S conveyed by the first sheet conveyance section 4. In skew correction on the sheet S, the pair of registration rollers 44 temporarily holds the sheet S. After temporarily holding the sheet S, the pair of registration rollers 44 then feeds the sheet S toward the first conveyor belt 32 in synchronization with image formation on the sheet S.

The first conveyor belt 32 is driven to convey the sheet S fed from the pair of registration rollers 44 in a predetermined direction. The first conveyor belt 32 is driven to circulate anticlockwise in FIG. 1. Circulation of the first conveyor belt 32 conveys the sheet S leftward in FIG. 1. Hereinafter, the direction in which the sheet S is conveyed by the first conveyor belt 32 will be referred to as a conveyance direction D. The sheet S conveyed by the first conveyor belt 32 passes through a location opposite to the recording heads 34. The first conveyor belt 32 is an endless belt in the present embodiment.

The recording heads 34 are disposed above the first conveyor belt 32. The recording heads 34 eject ink onto the sheet S based on dot data in a CMYK color model during the sheet S passing through the location opposite to the recording heads 34. The CMYK color model in the present embodiment is a model according to which an image is represented using four pieces of dot data in respective four colors of cyan, magenta, yellow, and black. The dot data will be described later in detail.

Note that the ink used in the present embodiment is a water-based ink. Once the water-based ink is ejected onto the sheet S, the sheet S becomes wet with water contained in the ink. Wetting of the sheet S may elongate one side (side onto which the water-based ink has been ejected) of the sheet S to cause partial curling of the sheet S. The recording heads 34a to 34d are disposed in order of the recording head 34a, the recording head 34b, the recording head 34c, and the recording head 34d from upstream to downstream in the conveyance direction D of the sheet S.

The recording head 34a is a linehead for yellow color that ejects a yellow ink. The recording head 34b is a linehead for magenta color that ejects a magenta ink. The recording head 34c is a linehead for cyan color that ejects a cyan ink. The recording head 34d is a linehead for black color that ejects a black ink.

The sheet S onto which ink has been ejected by the recording heads 34 is conveyed toward the second conveyor belt 36 by the first conveyor belt 32.

The second conveyor belt 36 is driven to convey the sheet S conveyed from the first conveyor belt 32 to the second sheet conveyance section 5.

The second sheet conveyance section 5 extends from one side end (left side end in FIG. 1) of the second conveyor belt 36 to the sheet ejecting section 6. The second sheet conveyance section 5 incudes a diverging member 51 at an intermediate location on a conveyance path. The diverging member 51 is pivotally supported to pivot and switch a conveyance destination of the sheet S between the sheet ejecting section 6 and the sheet reversing section 7. In a situation in which the recording heads 34 eject ink onto both sides of the sheet S, the sheet S of which one side has been subjected to ink ejection is guided to the sheet reversing section 7. By contrast, the sheet S of which both sides have been subjected to ink ejection in the above situation is guided to the sheet ejecting section 6. In a situation in which the recording heads 34 eject ink onto only one side of the sheet S, the sheet S of which one side has been subjected to ink ejection is guided to the sheet ejecting section 6.

The sheet ejecting section 6 includes a pair of ejection rollers 61 and an exit tray 62. The exit tray 62 is secured to the apparatus casing 100 so as to externally protrude from an exit port 110 located in the apparatus casing 100.

The pair of ejection rollers 61 feeds the sheet S conveyed by the second sheet conveyance section 5 toward the exit port 110. The sheet S fed by the pair of ejection rollers 61 is ejected out of the apparatus casing 100 from the exit port 110. The sheet S ejected from the exit port 110 is stacked on the exit tray 62.

The sheet reversing section 7 extends from the second sheet conveyance section 5 to the first sheet conveyance section 4. Specifically, one end of the sheet reversing section 7 is connected to the second sheet conveyance section 5 at a location where the diverging member 51 is disposed. On the other hand, the other end of the sheet reversing section 7 is connected to the first sheet conveyance section 4 at a location before the pair of registration rollers 44. The sheet reversing section 7 reverses the conveyance direction D of the sheet S guided to the sheet reversing section 7. Thereafter, ink is ejected onto both sides of the sheet S.

The controller 10 controls the entire inkjet recording apparatus 1. Specifically, the controller 10 executes computer programs stored in the storage section 80 to control the sheet feed section 2, the first sheet conveyance section 4, the second sheet conveyance section 5, the sheet ejecting section 6, the sheet reversing section 7, and the recording heads 34. The controller 10 is a central processing unit (CPU), for example. As illustrated in FIG. 2, the controller 10 includes a calculation section 101 and a selection section 102. The calculation section 101 calculates image density. The selection section 102 selects dot patterns corresponding to an image based on a prescribed condition. The calculation section 101 and the selection section 102 will be described later in detail.

The storage section 80 includes a main storage device (for example, a semiconductor memory) and an auxiliary storage device (for example, a semiconductor memory and/or a hard disk drive). The storage section 80 stores therein image densities in association with dot patterns.

FIG. 3 indicates a table of density ranges and dot patterns stored in the storage section 80. In the present embodiment, the storage section 80 stores therein a dot pattern "A" in association with a density range of "0 to 36". Also, the storage section 80 stores therein a dot pattern "B" in association with a density range of "37 to 73". Note that the dot patterns in association with the respective image density ranges can be optionally set by a user.

The following describes the image density. An image is constituted by a plurality of pixels. The pixels each include a plurality of color components. In the present embodiment, the pixels each include, as the color components, a red component having an R value, a green component having a G value, and a blue component having a B value. The color components of each pixel are each represented by respective numeric values of 0 to 255 to represent a density. For example, a black color is represented by respective color components having a R value of 0, a G value of 0, and a B value of 0. In another example, a white color is represented by respective color components have an R value of 255, a G value of 255, and a B value of 255. An image before conversion to dot data is based on a RGB color model. The RGB color model in the present embodiment is a model according to which an image is represented using an R value, a G value, and a B value.

The dot patterns each are a pattern for converting the pixels constituting an image to dot data. The recording heads 34 eject ink based on the dot data. The dot data is constituted by a plurality of dots. The dots each have an area smaller than one pixel. For example, the area of one pixel corresponds to a total area of 64 dots. The recording heads 34 each eject one ink droplet onto a sheet S for one dot. The amount of one ink droplet ejected from each recording head 34 is for example four to five picoliters.

Figure 4:
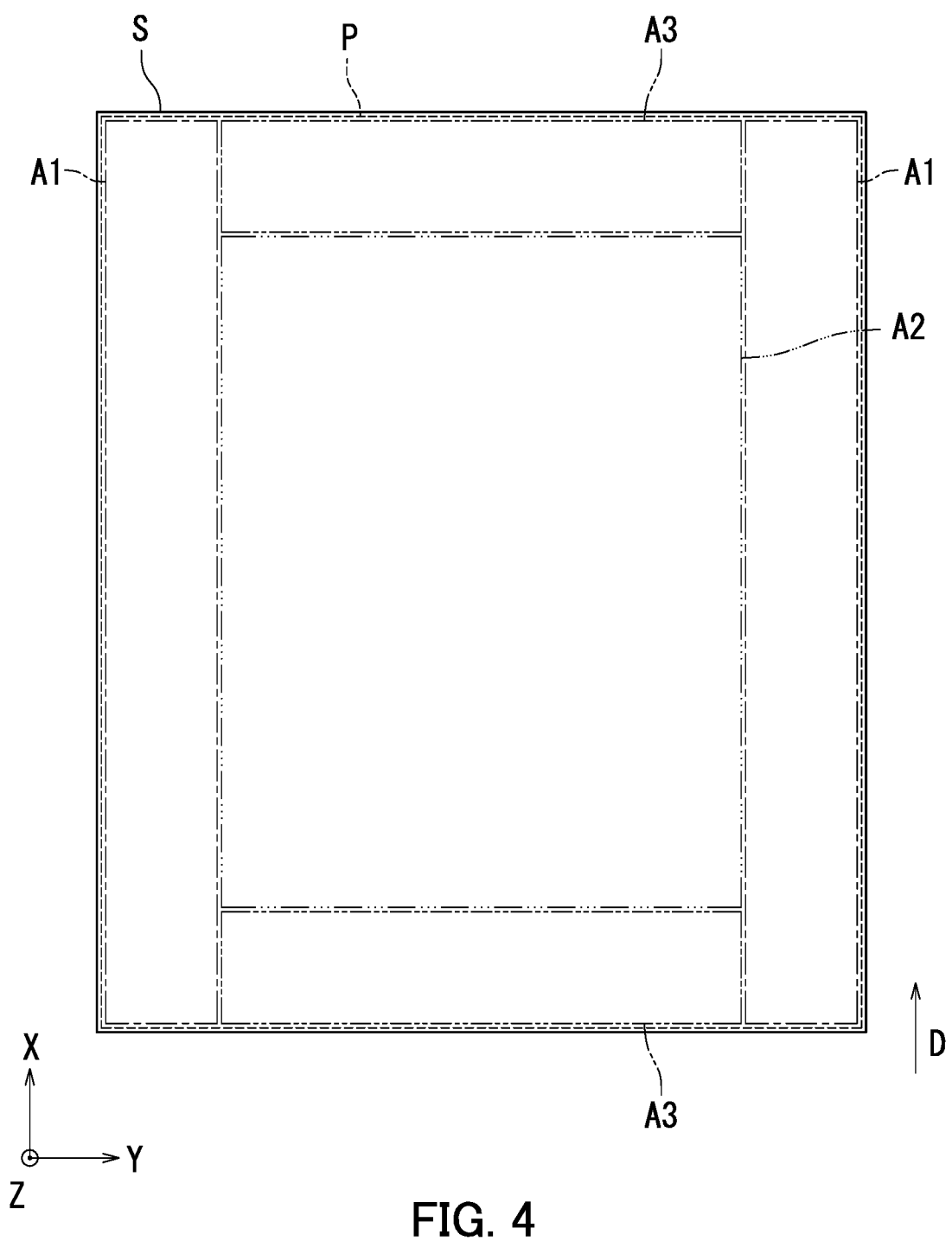
FIG. 4 illustrates an image including regions each density of which is calculated by a calculation section according to the first embodiment of the present disclosure.

An image will be described next with reference to FIG. 4. FIG. 4 illustrates an image P formed on the sheet S. The image P includes first regions A1 in pairs, a second region A2, and third regions A3 in pairs.

The first regions A1 in pairs correspond to a pair of end portions among a plurality of end portions of the image P that extends in the conveyance direction D of the sheet S. A width of each of the first regions A1 along the Y axis, that is, a length thereof in a direction perpendicular to the conveyance direction D is no greater than 5 mm, for example.

The third regions A3 in pairs correspond to a pair of end portions among the plurality of end portions of the image P that extends in a direction across the conveyance direction D of the sheet S, that is, a direction along the Y axis. A width of each of the third regions A3, that is, a length thereof in the conveyance direction D is no greater than 5 mm, for example. In the present embodiment, the direction in which the first regions A1 in pairs extend is perpendicular to the direction in which the third regions A3 in pairs extend.

The second region A2 is located between the first regions A1 in pairs. The second region A2 is also located between the third regions A3 in pairs.

The calculation section 101 and the selection section 102 will be described next in detail with reference to FIGS. 2-4. The calculation section 101 calculates densities of the respective first regions A1 included in the image P. Specifically, the calculation section 101 calculates densities of the pixels in the respective first regions A1 on a per color component basis. The calculation section 101 then calculates an average value of the densities of the pixels in each of the first regions A1 on a par color component basis. The calculation section 101 also calculates densities of the respective third regions A3 included in the image P. Specifically, the calculation section 101 calculates densities of the pixels in the respective third regions A3 on a per color component basis. The calculation section 101 then calculates an average value of the densities of the pixels in each of the third regions A3 on a per color component basis.

The calculation section 101 adjusts respective densities of the second region A2 and an end portion selected from among the plurality of end portions of the image P so as to blur a boundary between the second region A2 and the selected end portion. Specifically, the calculation section 101 adjusts the density of a region of the image P that includes the boundary between the selected region and the second region A2. In a situation in which one of the first regions A1 is selected, a region including a boundary between the selected region and the second region A2 extends in a direction in which the boundary extends, which is the X axis direction, and has a width of about 1 mm to 2 mm in a direction perpendicular to the direction in which the boundary extends, which is the Y axis direction. In a situation in which one of the third regions A3 is selected, a region including a boundary between the selected region and the second region A2 extends in a direction in which the boundary extends, which the Y axis direction, and has a width of about 1 mm to 2 mm in a direction perpendicular to the direction in which the boundary extends, which is the X axis direction. Specifically, the calculation section 101 adjusts the respective densities of the selected end region and the second region A2 so that the density of an edge portion of the selected region along an edge of the selected region adjacent to the second region A2 that has a width of about 0.5 mm to 1 mm approximates to the density of an edge portion of the second region A2 along an edge of the second region A2 adjacent to the selected region that has a width of about 0.5 mm to 1 mm. For example, the calculation section 101 adjusts the densities of one of the first regions A1 and the second region A2 so as to blur a boundary between the one first region A1 and the second region A2.

The calculation section 101 further adjusts the density of the end portion selected from among the end portions of the image P to form a density gradient from an inner edge toward an outer edge of the selected end portion. The outer edge of the selected end portion is opposite to the inner edge thereof. In the density gradient, the density reduces from the inner edge toward the outer edge of the selected end portion. For example, in a situation in which the calculation section 101 selects one of the first regions A1, the calculation section 101 adjusts the density of the selected first region A1 to form a density gradient in the selected first region A1 from an inner edge toward an outer edge opposite to the inner edge of the selected first region A1.

The selection section 102 selects, for the respective first regions A1, dot patterns corresponding to the respective first regions A1 according to the densities of the respective first regions A1 calculated after density adjustment. Specifically, the selection section 102 selects, for each of the first regions A1, a dot pattern corresponding to the first region A1 according to the average value of the densities of the pixels in the first region A1 calculated on a per color component basis by the calculation section 101. For example, in a situation in which the average value of the densities of the pixels in one of the first regions A1 calculated on a per respective color component basis by the calculation section 101 is 10, the selection section 102 selects the dot pattern "A" for the first region A1. The selection section 102 then converts each pixel constituting the first region A1 to dot data based on the dot pattern "A". The density of the dot pattern "A" corresponding to the first region A1 is lower than the density of the first region A1 calculated by the calculation section 101. In the above configuration, the density of the first region A1 converted to the dot data based on the dot pattern "A" corresponding to the first region A1 is lower than that of the first region A1 before conversion to the dot data.

Similarly, the selection section 102 selects, for each of the third regions A3, a dot pattern corresponding to the third region A3 according to the density of the third region A3 after density adjustment. The selection section 102 then converts the pixels in the third region A3 to dot data based on the dot pattern corresponding to the third region A3. The density of the dot pattern corresponding to the third region A3 is lower than that calculated by the calculation section 101. Therefore, the density of the third region A3 converted to the dot data is lower than that of the third region A3 before conversion to the dot data. In view of the foregoing, the density of the third region A3 converted to the dot data based on the dot pattern corresponding to the third region A3 is lower than that of the third region A3 before conversion to the dot data.

The selection section 102 further converts the second region A2 to dot data based on a predetermined dot pattern. The predetermined dot pattern is preset by a user.

The lower the density of an image is, the less the amount of ink ejected onto the sheet S. As such, the sheet S hardly curls. In view of the foregoing, when an average value of the densities of the pixels calculated on a per color component by the calculation section 101 is less than a threshold value in either of the first regions A1, the selection section 102 selects a preset specific dot pattern for the first region A1. The threshold value can be optionally set by a user. In other words, only when a density calculated by the calculation section 101 of either of the first regions A1 is no less than the threshold value, the selection section 102 selects a dot pattern corresponding to the first region A1 according to the density calculated by the calculation section 101. Specifically, when the average value of the densities of the pixels in a first region A1 calculated on a per color component basis by the calculation section 101 is no less than the threshold value, the selection section 102 selects a dot pattern according to the density calculated by the calculation section 101 for the first region A1.

In a similar manner, when the average value of the densities of the pixels on a per color component basis are less than a threshold value in either of the third regions A3, the selection section 102 selects a specific dot pattern for the third region A3.

The specific dot pattern is preset by a user. The specific dot pattern may be the same as or different from a dot pattern selected according to the density calculated by the calculation section 101. Alternatively, the specific dot pattern may be a predetermined dot pattern for converting the second region A2 to dot data.

The selection section 102 may select dot patterns according to the type of the sheet S in addition to the densities calculated by the calculation section 101. For example, the thicker the sheet S is, the larger or smaller amount of ink to be ejected onto the sheet S a dot pattern selected by the selection section 102 may necessitate.

The recording heads 34 eject ink onto the sheet S based on the dot pattern corresponding to a region of the image P other than the first regions A1 and the third regions A3, that is, the second region A2, the dot patterns corresponding to the respective first regions A1, and the dot patterns corresponding to the respective third regions A3.

As described with reference to FIGS. 1-4, the densities of the dot patterns corresponding to the respective first regions A1 are lower than the densities of the respective first regions A1 included in the image P in the present embodiment. The first regions A1 among the end portions of the image P each extend in the conveyance direction D of the sheet S. As such, the amount of ink ejected onto the end portions of the sheet S that correspond to the first regions A1 of the image P can be reduced while processing to calculate the density of a region of the image P other than the first regions A1 can be omitted. As a result, occurrence of sheet curling, which may be caused due to ink absorption by the sheet S, can be prevented. This can prevent the sheet S from coming into contact with the recording heads 34 during the time when the recording heads 34 re-eject ink onto the sheet S onto which ink has been ejected.

Furthermore, in the first embodiment, the respective densities of the second region A2 and the end portion selected from among the plurality of end portions of the image P are adjusted so as to blur the boundary between the selected end portion and the second region A2. This can reduce density difference between the selected end portion and the second region A2. As a result, formation of an undesirable line at the boundary between the selected end portion and the second region A2 can be prevented.

In addition, the density of the end portion selected from among the plurality of end portions of the image P is adjusted so as to reduce from the inner edge toward the outer edge of the selected end portion in the first embodiment. This can make density difference between the selected end portion and the second region A2 to be hardly perceivable. As a result, good appearance of the image P formed on the sheet S can be maintained and the amount of ink ejected onto the sheet S can be reduced.

Further, when the density of either or both of the first regions A1 are less than the threshold value, the selection section 102 in the first embodiment selects the specific dot pattern for the corresponding first region(s) A1. The above configuration can omit processing for the selection section 102 to select optimal dot patterns corresponding to the first region(s) A1 from among the plurality of dot patterns. As a result, a time period necessary for dot pattern selection by the selection section 102 can be shortened.

The dot patterns are selected according to the type of the sheet S in addition to the densities calculated by the calculation section 101 in the first embodiment. In the above configuration, the number of conditions for dot pattern selection increases. As a result, more optimal dot patterns can be selected than that in dot pattern selection regardless of the type of the sheet S by the selection section 102.

Figure 5:
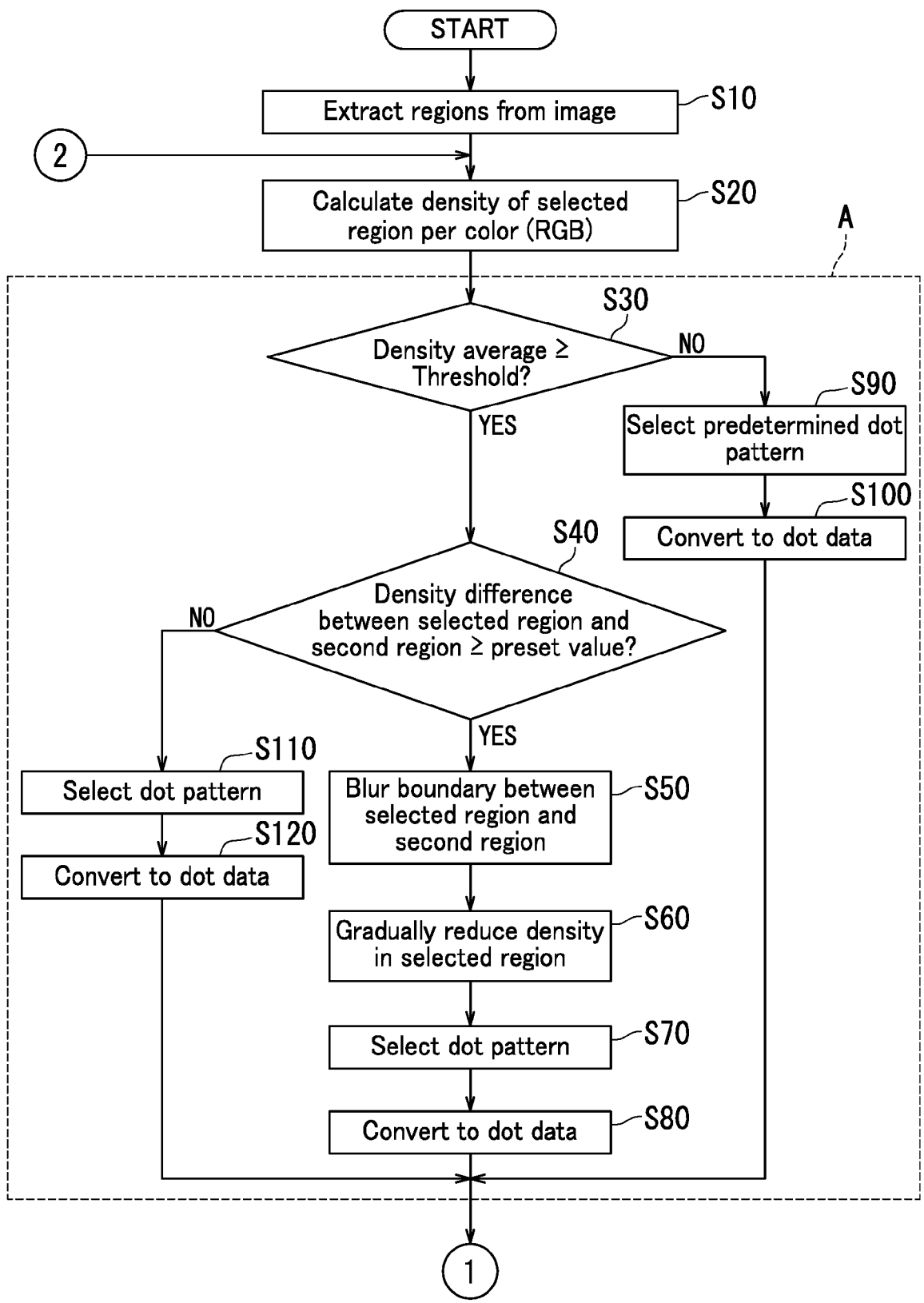
FIG. 5 is a flowchart depicting a former half of a method for adjusting the densities of a plurality of end portions of an image that the inkjet recording apparatus according to the first embodiment of the present disclosure uses.
Figure 6:
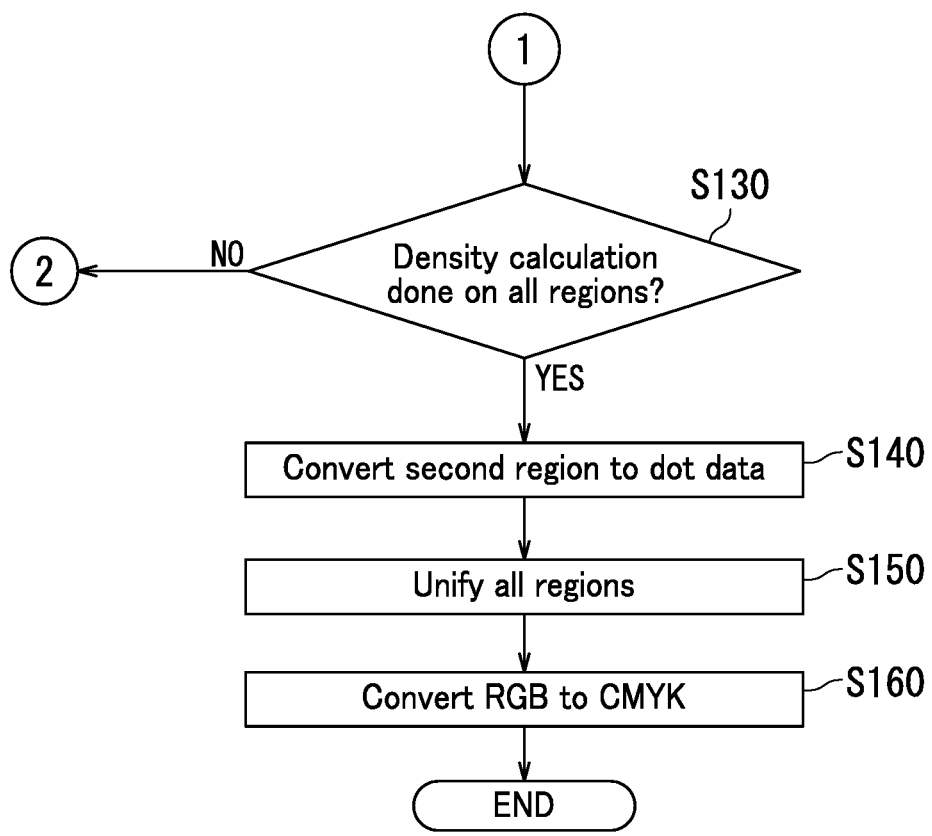
FIG. 6 is a flowchart depicting a latter half of the method for adjusting the densities of the end portions of the image that the inkjet recording apparatus according to the first embodiment of the present disclosure uses.

A method for adjusting the density of an image P that the inkjet recording apparatus 1 uses will be described next with reference to FIGS. 1-6. FIG. 5 is a flowchart depicting a former half of the method that the inkjet recording apparatus 1 uses to adjust the density of an image P. FIG. 6 is a flowchart depicting a latter half of the method that the inkjet recording apparatus 1 uses to adjust the density of the image P.

At Step S10, the calculation section 101 extracts a plurality of end portions of the image P from the image P as a plurality of regions. That is, the calculation section 101 extracts the first regions A1 in pairs and the third regions A3 in pairs from the image P.

At Step S20, the calculation section 101 calculates, on a per color component basis (R value, G value, and B value), the density of a region selected from among the extracted regions. For example, the calculation section 101 first selects one of the first regions A1 from among the extracted regions and calculates the density of the selected one of the first regions A1 on a per color component basis.

At Step S30, the calculation section 101 calculates an average value of the densities of the pixels in the selected region on a per color component basis and determines whether or not the average value is no less than the threshold value. The threshold value is optionally set by a user. When negative determination is made by the calculation section 101 (NO), that is, when the average value is less than the threshold value at Step S30, the routine proceeds to Step S90. At Step S90, the selection section 102 selects the specific dot pattern preset by a user. At Step S100, the selection section 102 converts the selected region to dot data based on the specific dot pattern.

When positive determination is made by the calculation section 101 (YES) at Step S30, the routine proceeds to Step S40. At Step S40, the selection section 102 determines whether or not a difference between the average value of the densities of the pixels in the selected region on a per color component basis and the density of an edge portion among a plurality of edge portions of the second region A2 that is adjacent to the selected region is no less than a preset value. The preset value can be optionally set by a user. When negative determination is made by the selection section 102

(NO) at Step S40, the routine proceeds to Step S110. At Step S110, the selection section 102 selects a dot pattern corresponding to the average value of the densities of the pixels in the selected region on a per color component basis. At Step S120, the selection section 102 converts the selected region to dot data based on the selected dot pattern.

When positive determination is made by the selection section 102 (YES) at Step S40, the routine proceeds to Step S50. At Step S50, the calculation section 101 adjusts the densities of the selected region and the second region A2 so as to blur a boundary between the selected region and the second region A2.

At Step S60, the calculation section 101 adjusts the density of the selected region to form a density gradient from an inner edge toward an outer edge of the selected region. The outer edge of the selected region is opposite to the inner edge thereof. In other words, the calculation section 101 makes the density of the selected region gradually reduce from the inner edge toward the outer edge of the selected region.

At Step S70, the selection section 102 selects a dot pattern corresponding to the region in which the density is gradually reduced at Step S60. At Step S80, the selection section 102 then converts the selected region to dot data based on the dot pattern selected at Step S70.

As depicted in FIG. 6, the selection section 102 determines at Step S130 whether or not the calculation section 101 performs density calculation on all of the extracted regions. For example, in a situation in which the calculation section 101 has calculated the density of each of the first regions A1 and not calculated the density of each of the third region A3, the selection section 102 makes negative determination (NO) at Step S130 and the routine then proceeds to Step S20. At Step S20, the calculation section 101 selects either one of the third regions A3 and calculates the density of the selected third region A3.

When positive determination is made by the selection section 102 (YES) at Step S130, the routine proceeds to Step S140. At Step S140, the selection section 102 converts the second region A2 to dot data based on the preset predetermined dot pattern. Note that the predetermined dot pattern used in Step S140 may be different from or the same as the specific dot pattern used in Step S90. At Step S150, the selection section 102 unifies all the regions that have been converted to the dot data, that is, the first regions A1 in pairs converted to the dot data, the second region A2 converted to the dot data, and the third regions A3 in pairs converted to the dot data. At Step S160, the selection section 102 converts the color model of the unified image P from the RGB color model to the CMYK color model.

Second Embodiment

The following describes an inkjet recording apparatus 1 according to a second embodiment with reference to FIGS. 1, 2, 7, and 8. The inkjet recording apparatus 1 according to the second embodiment is different from that in the first embodiment in that density adjustment is executed on the end portions of the image P in parallel. The second embodiment will be described mainly based on differences compared with the first embodiment.

Figure 7:
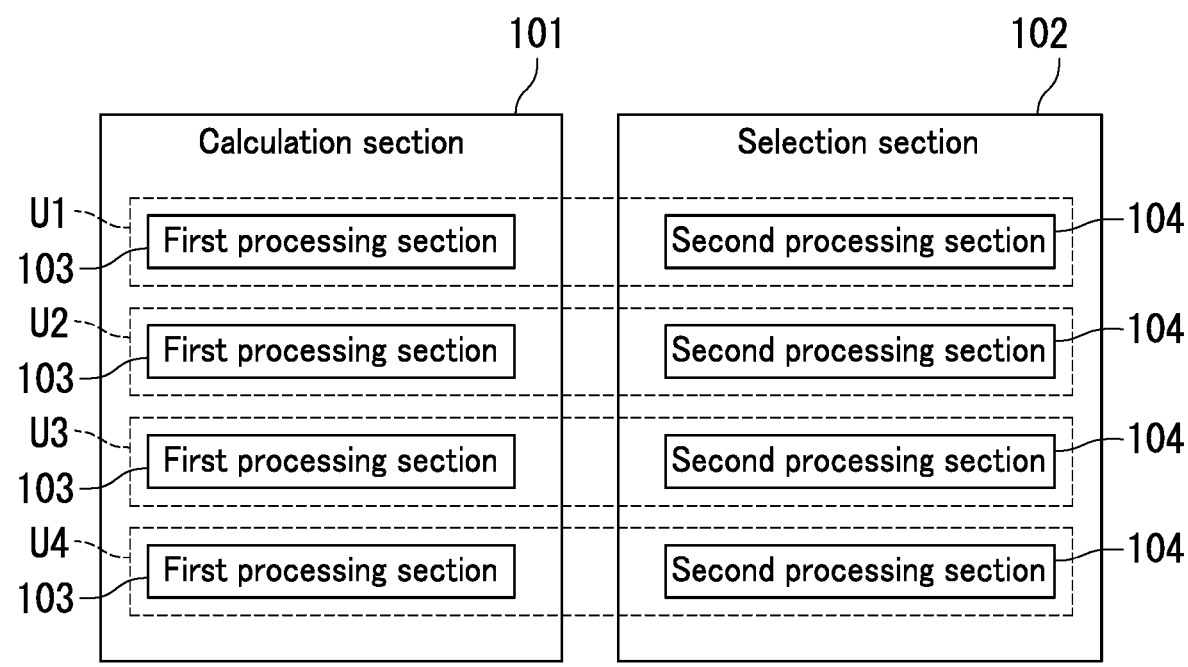
FIG. 7 illustrates a calculation section and a selection section according to the second embodiment of the present disclosure.

FIG. 7 is a block diagram of a calculation section 101 and a selection section 102 according to the second embodiment. The calculation section 101 includes a plurality of first processing sections 103. The selection section 102 includes a plurality of second processing sections 104. One of the first processing sections 103 constitutes a unit U1 (first unit) in combination with one of the second processing sections 104. A unit U2 (second unit), a unit U3 (third unit), and a unit U4 (fourth unit) are constituted in a similar manner.

The respective first processing sections 103 of the calculation section 101 execute density calculation in parallel on one of the first regions A1 in pairs, the other of the first regions A1 in pairs, one of the third regions A3 in pairs, and the other of the third regions A3 in pairs. That is, the units U1, U2, U3, and U4 respectively execute density calculation in parallel on one of the first regions A1 in pairs, the other of the first regions A1 in pairs, one of the third regions A3 in pairs, and the other of the third regions A3 in pairs.

The respective second processing sections 104 of the selection section 102 select in parallel a dot pattern corresponding to one of the first regions A1 in pairs, a dot pattern corresponding to the other of the first regions A1 in pairs, a dot pattern corresponding to one of the third regions A3 in pairs, and a dot pattern corresponding to the other of the third regions A3 in pairs. That is, the units U1, U2, U3, and U4 respectively selects in parallel a dot pattern corresponding to one of the first regions A1 in pairs, a dot pattern corresponding to the other of the first regions A1 in pairs, a dot pattern corresponding to one of the third regions A3 in pairs, and a dot pattern corresponding to the other of the third regions A3 in pairs.

As described with reference to FIG. 7, the calculation section 101 executes parallel density calculation on the respective end portions of the image P and the selection section 102 executes parallel selection of dot patterns corresponding to the respective end portions of the image P in the second embodiment. In the above configuration, a time period necessary for processing execution can be shortened when compared with a configuration in which density calculation and dot pattern selection are each executed on an end portion by end portion basis of the image P. As a result, a time period necessary for density adjustment on the image P can be further shortened and the amount of ink ejected onto the sheet S can be reduced.

Figure 8:
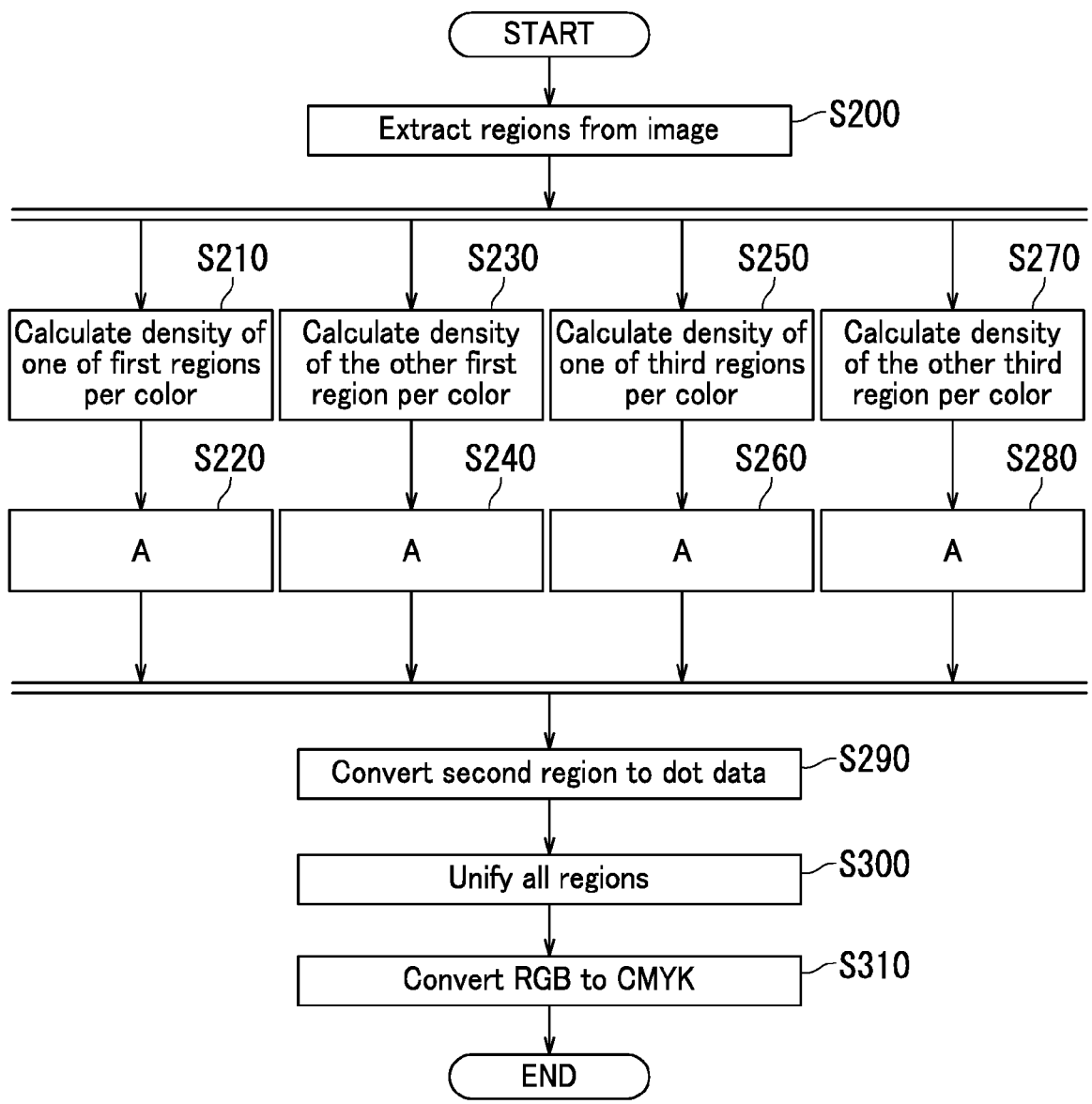
FIG. 8 is a flowchart depicting a density adjusting method on a plurality of end portions of an image that an inkjet recording apparatus according to the second embodiment of the present disclosure executes in parallel.

A method for adjusting densities of the end portions of an image P that the inkjet recording apparatus 1 uses will be described next with reference to FIGS. 1-8. FIG. 8 is a flowchart depicting the method by which the inkjet recording apparatus 1 according to the second embodiment adjusts the density of the image P.

At Step S200, the calculation section 101 extracts a plurality of end portions of the image P from the image P as a plurality of regions. The calculation section 101 executes Steps S210, S230, S250, and S270 in parallel, and the selection section 102 executes Steps S220, S240, S260, and S280 in parallel. Steps S220, S240, S260, and S280 each include Steps S30 to S120 in FIG. 5 described in the first embodiment.

At Step S210, the calculation section 101 calculates the densities of the pixels in one of the first regions A1 on a per color component basis. At Step S220, the selection section 102 selects a dot pattern and converts one of the first regions A1 in pairs to dot data based on the selected dot pattern so that the density of the one first region A1 is reduced. Steps S230, S250, and S270 and Steps S240, S260, and S280 are executed in a similar manner in parallel to Step S210 and Step S220, respectively.

At Step S290, the selection section 102 converts the second region A2 to dot data based on the predetermined dot pattern. At Step S300, the selection section 102 unifies all the regions that have been converted to the dot data, that is, the first regions A1 each converted to the dot data, the second region A2 converted to the dot data, and the third regions A3 each converted to the dot data. At Step S310, the selection section 102 converts the color model of the image P as a result of unification from the RGB color model to the CMYK color model.

As has been described with reference to FIGS. 1-8, the densities of the dot patterns corresponding to the respective first regions A1 are lower than those of the respective first regions A1 in the image P according to the first and second embodiments. The first regions A1 among the plurality of end portions of the image P each extend in the conveyance direction D of the sheet S. Accordingly, processing for density calculation on a region of the image P other than the first regions A1 and the third regions A3 can be omitted and the amount of ink ejected onto the end portions of the sheet S corresponding to the first regions A1 can be reduced. As a result, occurrence of sheet curling, which may be caused due to ink absorption by the sheet S, can be prevented. This can prevent the sheet S from coming into contact with the recording heads 34 during the time when the recording heads 34 re-eject ink onto the sheet S to which ink has been ejected.

The embodiments of the present disclosure have been described so far with reference to the drawings (FIGS. 1-8). However, the present disclosure is not limited to the above embodiments and a wide range of alterations can be made to the embodiments so long as such alterations do not deviate from the intended scope of the present disclosure (for example, (1) to (4) below). The drawings are schematic illustrations that emphasize elements of configuration in order to facilitate understanding thereof. Therefore, in order that the elements can be easily illustrated in the drawings, properties of each of the elements, such as thickness, length, and number thereof, may differ from actual properties of the elements. Further, the properties of each of the elements, such as shape and dimension thereof described in the above embodiments are mere examples and not limited specifically. The properties of the elements can be altered in various manners within the scope not substantially departing from the configuration of the present disclosure.

(1) The calculation section 101 includes the four first processing sections 103 and the selection section 102 includes the four second processing sections 104, as described with reference to FIG. 7. However, the calculation section 101 may include a plurality of first processing sections 103 of which number is different from 4 and the selection section 102 may include a plurality of second processing sections 104 of which number is different from 4. The number of the first processing sections 103 may be different from that of the second processing sections 104.

(2) As has been described with reference to FIGS. 6 and 8, the selection section 102 converts the color model of the image P converted to dot data from the RGB color model to the CMYK color model. However, the selection section 102 may convert the color model of the image P from the RGB color model to the CMYK color model before the calculation section 101 extracts the plurality of regions from the image P or convert the color model of all the regions before unification from the RGB color model to the CMYK color model.

(3) As has been described with reference to FIG. 5, the calculation section 101 executes density adjustment to blur a boundary between the second region A2 and an end portion selected from among the end portions of the image P and then executes density adjustment on the selected end portion to form a density gradient in the selected end portion. However, the calculation section 101 may execute the density adjustment to blur a boundary between the second region A2 and an end portion selected from among the plurality of end portions of the image P after the density adjustment on the selected end portion to form a density gradient in the selected end portion.

(4) As has been described so far with reference to FIGS. 1-8, the inkjet recording apparatus 1 adjusts the densities of the first and third regions A1 and A3 among the plurality of end portions of the image P. However, the inkjet recording apparatus 1 may adjust the densities of at least the pair of the first regions A1 among the plurality of end portions of the image P. In the above configuration, the recording heads 34 eject ink onto the sheet S based on a dot pattern corresponding to a region of the image P other than the first regions A1 and dot patterns corresponding to the respective first regions A1.

What is claimed is:

1. An inkjet recording apparatus comprising:
   a calculation section configured to calculate respective densities of first regions in pairs included in an image;
   a selection section configured to select dot patterns corresponding to the respective first regions according to the respective densities of the first regions calculated by the calculation section; and
   a recording head configured to eject ink onto a sheet based on a dot pattern corresponding to a region of the image other than the first regions and the dot patterns corresponding to the respective first regions, wherein
   the first regions in pairs are end portions in pairs among a plurality of end portions of the image that each extend in a conveyance direction of the sheet, and
   the dot patterns corresponding to the respective first regions each have a density lower than a corresponding one of the densities of the respective first regions calculated by the calculation section.

2. The inkjet recording apparatus according to claim 1, wherein
   when the density of at least one of the first regions calculated by the calculation section is no less than a threshold value, the selection section selects one of the dot patterns that corresponds to the at least one first region according to the density of the one at least one first region calculated by the calculation section.

3. The inkjet recording apparatus according to claim 1, wherein
   the calculation section adjusts the densities of the respective first regions to form a density gradient from an inner edge toward an outer edge opposite to the inner edge of each of the first regions, and
   density reduces from the inner edge toward the outer edge of each of the first regions in the density gradient.

4. The inkjet recording apparatus according to claim 1, wherein
   the image further includes a second region located between the first regions in pairs, and
   the calculation section adjusts densities of the respective first regions and the second region to blur boundaries between the respective first regions and the second region.

5. The inkjet recording apparatus according to claim 1, wherein
   the calculation section executes density calculation in parallel on
      one of the first regions in pairs and
      the other of the first regions in pairs, and
   the selection section selects in parallel
      a dot pattern corresponding to one of the first regions in pairs and a dot pattern corresponding to the other of the first regions in pairs.

6. The inkjet recording apparatus according to claim 1, wherein
the calculation section calculates respective densities of third regions in pairs included in the image,
the selection section selects dot patterns corresponding to the respective third regions according to the respective densities of the third regions,
the recording head ejects the ink onto the sheet based on a dot pattern corresponding to a region of the image other than the first regions and the third regions, the dot patterns corresponding to the respective first regions, and the dot patterns corresponding to the respective third regions,
the third regions in pairs are end portions in pairs among the plurality of end portions of the image that each extend in a direction perpendicular to the conveyance direction of the sheet, and
the dot patterns corresponding to the respective third regions each have a density lower than a corresponding one of the densities of the respective third regions calculated by the calculation section.

7. The inkjet recording apparatus according to claim 6, wherein
the calculation section executes density calculation in parallel on
one of the first regions in pairs,
the other of the first regions in pairs,
one of the third regions in pairs, and
the other of the third regions in pairs, and
the selection section selects in parallel
a dot pattern corresponding to one of the first regions in pairs,
a dot pattern corresponding to the other of the first regions in pairs,
a dot pattern corresponding to one of the third regions in pairs, and
a dot pattern corresponding to the other of the third regions in pairs.

8. The inkjet recording apparatus according to claim 1, wherein
the selection section selects the dot patterns according to a type of the sheet.

9. The inkjet recording apparatus according to claim 3, wherein
the image further includes a second region located between the first regions in pairs, and
after density adjustment on the first regions to form the density gradient from the inner edge toward the outer edge opposite to the inner edge of each of the first regions, the calculation section adjusts the densities of the respective first regions and a density of the second region so as to blur boundaries between the respective first regions and the second region.

10. The inkjet recording apparatus according to claim 1, wherein
the first regions and the region other than the first regions of the image each are constituted a plurality of pixels,
the selection section
converts the pixels constituting the first regions and the pixels constituting the region other than the first regions to dot data, the pixels constituting the first regions being converted based on the selected dot patterns, the pixels constituting the region other than the first regions being converted based on the dot pattern corresponding to the region of the image other than the first regions, and
unifies the first regions and the region other than the first regions that each are converted to the dot data, and
the densities of the respective first regions converted to the dot data each are lower than a corresponding one of the densities of the respective first regions before conversion to the dot data.

11. The inkjet recording apparatus according to claim 7, wherein
the calculation section include a plurality of first processing sections,
the selection section include a plurality of second processing sections,
one of the first processing sections constitutes a first unit in combination with one of the second processing sections,
another of the first processing sections constitutes a second unit in combination with another one of the second processing sections,
still another of the first processing sections constitutes a third unit in combination with still another one of the second processing sections,
yet another of the first processing sections constitutes a fourth unit in combination with still yet another one of the second processing sections, and
the first, second, third, and fourth units
respectively execute density calculation in parallel on
one of the first regions in pairs,
the other of the first regions in pairs,
one of the third regions in pairs,
the other of the third regions in pairs, and
respectively select in parallel
a dot pattern corresponding to one of the first regions,
a dot pattern corresponding to the other of the first regions in pairs,
a dot pattern corresponding to one of the third regions in pairs, and
a dot pattern corresponding to the other of the third regions in pairs.

\* \* \* \* \*